United States Patent
Liu

(10) Patent No.: US 11,432,293 B2
(45) Date of Patent: Aug. 30, 2022

(54) RESOURCE INDICATION METHOD, TERMINAL DEVICE, AND NETWORK DEVICE

(71) Applicant: HUAWEI TECHNOLOGIES CO., LTD., Guangdong (CN)

(72) Inventor: Yong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/562,249

(22) Filed: Sep. 5, 2019

(65) Prior Publication Data

US 2019/0394781 A1 Dec. 26, 2019

Related U.S. Application Data

(63) Continuation of application No. PCT/CN2018/110922, filed on Oct. 19, 2018.

(30) Foreign Application Priority Data

Jan. 12, 2018 (CN) .......................... 201810031914.2

(51) Int. Cl.
*H04W 4/00* (2018.01)
*H04W 72/04* (2009.01)
(Continued)

(52) U.S. Cl.
CPC ....... *H04W 72/0493* (2013.01); *H04L 1/0026* (2013.01); *H04L 1/1614* (2013.01); *H04W 72/0446* (2013.01)

(58) Field of Classification Search
CPC ......... H04W 72/0493; H04W 72/0446; H04W 72/04; H04L 1/0026; H04L 1/1614; H04L 5/00; H04L 5/14; H04L 5/008
See application file for complete search history.

(56) References Cited

U.S. PATENT DOCUMENTS

2012/0120905 A1* 5/2012 Ko .................. H04J 13/004
370/479
2013/0088949 A1* 4/2013 Zhang ............... H04L 5/0007
370/208
(Continued)

FOREIGN PATENT DOCUMENTS

| CN | 106685503 A | 5/2017 |
| CN | 107425948 A | 12/2017 |
| WO | 2017197642 A1 | 11/2017 |

OTHER PUBLICATIONS

LG Electronics, "On CSI-RS design",3GPP TSG RAN WG1 Meeting NR#3,R1-1715864, ,Nagoya, Japan, Sep. 18-21, 2017, 7 pages.
(Continued)

*Primary Examiner* — Abdelnabi O Musa
(74) *Attorney, Agent, or Firm* — Fish & Richardson P.C.

(57) ABSTRACT

This application provides a resource indication method, a terminal device, and a network device. The method includes: determining, by a network device, first indication information, and sending the first indication information to a terminal device, where the first indication information is used to indicate a time domain location occupied in a resource unit by a component pattern of a reference signal; and receiving, by the terminal device, the first indication information, and determining, based on the first indication information, the time domain location occupied in the resource unit by the reference signal. The resource indication method, the terminal device, and the network device in the embodiments of this application help implement a plurality of different mapping modes of a reference signal.

16 Claims, 7 Drawing Sheets

(51) Int. Cl.
  H04L 1/00 (2006.01)
  H04L 1/16 (2006.01)

(56) References Cited

U.S. PATENT DOCUMENTS

| | | | | |
|---|---|---|---|---|
| 2013/0208678 | A1* | 8/2013 | Zhang | H04L 5/0053 |
| | | | | 370/329 |
| 2016/0013906 | A1* | 1/2016 | Guo | H04L 5/0073 |
| | | | | 370/329 |
| 2016/0182209 | A1* | 6/2016 | Li | H04L 5/1469 |
| | | | | 370/329 |
| 2017/0005848 | A1* | 1/2017 | Zheng | H04L 27/2675 |
| 2017/0273077 | A1* | 9/2017 | Kim | H04W 72/0446 |
| 2018/0241508 | A1* | 8/2018 | Chervyakov | H04L 27/2675 |
| 2018/0316470 | A1 | 11/2018 | Li et al. | |
| 2019/0098615 | A1 | 3/2019 | Wang et al. | |
| 2019/0273544 | A1* | 9/2019 | Cha | H04L 5/0091 |

OTHER PUBLICATIONS

3GPP TS 38.331 V15.0.0 (Dec. 2017), 3rd Generation Partnership Project, Technical Specification Group Radio Access Network NR Radio Resource Control (RRC) protocol specification(Release 15), 188 pages.
3GPP TS 38.211 V15.0.0 (Dec. 2017), 3rd Generation Partnership Project, Technical Specification Group Radio Access Network, NR, Physical channels and modulation(Release 15), 73 pages.
3GPP TS 36.213 V14.5.0 (Dec. 2017), 3rd Generation Partnership Project, Technical Specification Group Radio Access Network, Evolved Universal Terrestrial Radio Access (E-UTRA), Physical layer procedures(Release 14), 462 pages.
3GPP TS 38.214 V2.0.0 (Dec. 2017), 3rd Generation Partnership Project, Technical Specification Group Radio Access Network, NR, Physical layer procedures for data (Release 15), 71 pages.
Office Action issued in Chinese Application No. 201910579421.7 dated Feb. 12, 2020, 16 pages (With English Translation).
CATT, "Design of CSI-RS for 081 acquisition," 3GPP TSG RAN WG1 Meeting #90, R1-1712381, Prague, Czechia, XP051315197, Aug. 21-25, 2017, 4 pages.
Extended European Search Report issued in European Application No. 18899899.1 dated Jul. 9, 2020, 9 pages.
Huawei et al., "Summary of email discussion on CSI-RS open issues," 3GPP TSG RAN WG1 Meeting #91, R1-1719439, Reno, USA, XP051369141, Nov. 27-Dec. 1, 2017, 16 pages.
CATT, "Remaining issues on CSI-RS," 3GPP TSG RAN WG1 #90b, R1-1717817, Prague, CZ, Oct. 9-13, 2017, 6 pages.
Intel Corporation, "Remaining details on CSI-RS," 3GPP TSG RAN WG1 #90b, R1-1717372, Prague, CZ, Oct. 9-13, 2017, 10 pages.
Office Action issued in Japanese Application No. 2020-538617 dated Sep. 14, 2021, 8 pages (with English translation).

* cited by examiner

RESOURCE INDICATION METHOD, TERMINAL DEVICE, AND NETWORK DEVICE

CROSS-REFERENCE TO RELATED APPLICATIONS

This application is a continuation of International Application PCT/CN2018/110922, filed on Oct. 19, 2018, which claims priority to Chinese Patent Application No. 201810031914.2, filed on Jan. 12, 2018. The disclosures of the aforementioned applications are hereby incorporated by reference in their entireties.

TECHNICAL FIELD

This application relates to the communications field, and in particular, to a resource indication method, a terminal device, and a network device in the communications field.

BACKGROUND

To implement channel quality measurement and data demodulation in a higher-order multi-antenna system, a plurality of reference signals are defined in an existing communications system, for example, a cell-specific reference signal (cell-specific reference signals, CRS), a demodulation reference signal (demodulation reference signal, DMRS), and a channel state information-reference signal (channel state information-reference signal, CSI-RS) on a downlink link. The DMRS is used to assist in demodulation of a physical downlink shared channel (physical downlink shared channel, PDSCH). The CSI-RS may be used to report information such as a channel quality indicator (channel quality indicator, CQI), a precoding matrix indicator (precoding matrix indicator, PMI), and a rank indicator (rank indicator, RI).

To implement correct channel estimation of a terminal device, the terminal device needs to learn of a mapped location of a reference signal in a resource unit. The mapped location of the reference signal in the resource unit may be configured for the terminal device by a network device through signaling. The terminal device may obtain different mapped locations in different mapping modes. Therefore, how to design a signaling solution to indicate a plurality of different mapping modes of the reference signal becomes an urgent problem that needs to be resolved.

SUMMARY

This application provides a resource indication method, a terminal device, and a network device, to help implement a plurality of different mapping modes of a reference signal.

According to a first aspect, a resource indication method is provided, including: receiving, by a terminal device, first indication information sent by a network device, where the first indication information is used to indicate a time domain location occupied in a resource unit by a component pattern of a reference signal; and determining, by the terminal device based on the first indication information, the time domain location occupied in the resource unit by the reference signal.

It should be understood that the terminal device may obtain different time domain locations in different mapping modes, and the terminal device may determine a time-frequency location occupied in the resource unit by each component pattern of the reference signal, to finally determine a time-frequency location occupied in the resource unit by the reference signal. It should be further understood that in this embodiment of this application, there may be one or more component patterns of the reference signal. This is not limited in this embodiment of this application.

In the resource indication method in this embodiment of this application, the network device sends, to the terminal device, the indication information used to indicate the time domain location occupied in the resource unit by the component pattern of the reference signal, so that the terminal device can determine, based on the indication information, the time domain location occupied in the resource unit by the reference signal, to help implement a plurality of different mapping modes of the reference signal and correct channel estimation, and improve data transmission efficiency.

With reference to the first aspect, in some implementations of the first aspect, the first indication information includes any one piece of the following information: a start symbol location occupied in the resource unit by the component pattern, an offset of the start symbol location relative to a reference symbol, an index of a symbol occupied in the resource unit by the component pattern, and a first bitmap, where the first bitmap is used to indicate a symbol occupation status of the component pattern in the resource unit.

It should be understood that the foregoing four different indication manners can directly or indirectly indicate the time domain location occupied by the reference signal in the resource unit to the terminal device. A specific indication manner may be agreed on in advance in a protocol, or may be configured for the terminal device by the network device through signaling. This is not limited in this embodiment of this application.

In the resource indication method in this embodiment of this application, the network device may indicate, to the terminal device in different manners, the time domain location occupied in the resource unit by the component pattern of the reference signal, so that the terminal device can correctly distinguish a plurality of different mapping modes based on the indication information, and determine the time domain location occupied by the reference signal in the resource unit, to help implement correct channel estimation and improve data transmission efficiency.

With reference to the first aspect, in some implementations of the first aspect, the reference signal includes at least two component patterns, and symbol locations occupied in the resource unit by the at least two component patterns are noncontiguous; and the first indication information is used to indicate a start symbol location occupied in the resource unit by each of the at least two component patterns.

When the reference signal includes two component patterns that are noncontiguous in time domain, the network device needs to separately indicate time domain start locations of the two component patterns to the terminal device, so that the terminal device determines a distribution status of the reference signal in time domain. It should be understood that the start symbol location is used to indicate the time domain location occupied by the reference signal in the resource unit, so that signaling overheads of the network device can be reduced.

With reference to the first aspect, in some implementations of the first aspect, the first indication information includes the start symbol location occupied in the resource unit by each component pattern; or the first indication information includes a start symbol location set, and the start symbol location set includes the start symbol location occupied in the resource unit by each component pattern; or the first indication information includes an index of the start symbol location set.

Specifically, the first indication information may be directly an index of a start symbol of the component pattern, or may be the start symbol location set (or an array), or may be the index of the start symbol location set. This is not limited in this embodiment of this application. When the index of the start symbol location set is used to indicate the start symbol of the component pattern, a plurality of start symbol location sets may be configured and numbered, to facilitate indication by the network device. For example, there are three start symbol location sets {5, 8}, {5, 9}, and {5, 10}, and indexes of the start symbol location sets are sequentially 0, 1, and 2. In FIG. 5, the first indication information may be directly two values of 5 and 9, or the first indication information may be a set or an array that includes two symbol locations 5 and 9, or the first indication information may be the index 1 of the set {5, 9}. The terminal device may determine the corresponding start symbol location set {5, 9} based on the index 1, to further determine the time domain location occupied by the reference signal.

With reference to the first aspect, in some implementations of the first aspect, before the determining, by the terminal device based on the first indication information, the time domain location occupied by the reference signal in the resource unit, the method further includes: receiving, by the terminal device, second indication information sent by the network device, where the second indication information is used to indicate at least one piece of the following information used by the network device to send the reference signal: a port quantity, a port density, a frequency domain location occupied in the resource unit by the component pattern, and a code division multiplexing CDM type: and determining, by the terminal device, a type and a quantity of component patterns based on the second indication information and a first mapping relationship, where the first mapping relationship is used to indicate a correspondence between the second indication information and the type and the quantity of component patterns: and the determining, by the terminal device based on the first indication information, the time domain location occupied in the resource unit by the reference signal includes: determining, by the terminal device based on the first indication information and the type and the quantity of component patterns, the time domain location occupied in the resource unit by the reference signal.

It should be understood that if the first indication information is used to indicate the start symbol location occupied in the resource unit by the component pattern, the terminal device may determine, based on the start symbol location occupied in the resource unit by the component pattern and the type and the quantity of component patterns, the time domain location occupied in the resource unit by the reference signal; if the first indication information is used to indicate the offset of the start symbol location relative to the reference symbol, the terminal device may determine, based on the offset of the start symbol location relative to the reference symbol and the type and the quantity of component patterns, the time domain location occupied in the resource unit by the reference signal: if the first indication information is used to indicate the index of the symbol occupied in the resource unit by the component pattern, the terminal device may determine, based on the index of the symbol occupied in the resource unit by the component pattern and the type and the quantity of component patterns, the time domain location occupied in the resource unit by the reference signal; and if the first indication information is used to indicate the first bitmap, the terminal device may determine, based on the first bitmap and the type and the quantity of component patterns, the time domain location occupied in the resource unit by the reference signal.

With reference to the first aspect, in some implementations of the first aspect, the reference signal is a channel state information reference signal CSI-RS.

According to a second aspect, another resource indication method is provided, including: determining, by a network device, first indication information, where the first indication information is used to indicate a time domain location occupied in a resource unit by a component pattern of a reference signal; and sending, by the network device, the first indication information to a terminal device, so that the terminal device determines the time domain location occupied in the resource unit by the reference signal.

With reference to the second aspect, in some implementations of the second aspect, the first indication information includes any one piece of the following information: a start symbol location occupied in the resource unit by the component pattern, an offset of the start symbol location relative to a reference symbol, an index of a symbol occupied in the resource unit by the component pattern, and a first bitmap, where the first bitmap is used to indicate a symbol occupation status of the component pattern in the resource unit.

With reference to the second aspect, in some implementations of the second aspect, the reference signal includes at least two component patterns, and symbol locations occupied in the resource unit by the at least two component patterns are noncontiguous; and the first indication information is used to indicate a start symbol location occupied in the resource unit by each of the at least two component patterns.

With reference to the second aspect, in some implementations of the second aspect, the first indication information includes the start symbol location occupied in the resource unit by each component pattern: or the first indication information includes a start symbol location set, and the start symbol location set includes the start symbol location occupied in the resource unit by each component pattern: or the first indication information includes an index of the start symbol location set.

With reference to the second aspect, in some implementations of the second aspect, the method further includes: sending, by the network device, second indication information to the terminal device, where the second indication information is used to indicate at least one piece of the following information used by the network device to send the reference signal: a port quantity, a port density, a frequency domain location occupied in the resource unit by the component pattern, and a code division multiplexing CDM type.

With reference to the second aspect, in some implementations of the second aspect, the reference signal is a channel state information reference signal CSI-RS.

According to a third aspect, another resource indication method is provided, including: receiving, by a terminal device, a second bitmap sent by a network device, where the second bitmap is used to indicate a frequency domain occupation status of a component pattern of a reference signal in a resource unit; receiving, by the terminal device, third indication information sent by the network device, where the third indication information is used to indicate at least one piece of the following information used by the network device to send the reference signal: a port quantity, a port density, and a code division multiplexing CDM type; and determining, by the terminal device, a type and a quantity of component patterns based on the third indication information and a length and content of the second bitmap.

In the resource indication method in this embodiment of this application, the terminal device determines the type and the quantity of component patterns with reference to bitmap content used to indicate the frequency domain occupation status of the component pattern, and therefore can determine the time domain location and a frequency domain location occupied in the resource unit by the reference signal, to help implement correct channel estimation and improve data transmission efficiency.

With reference to the third aspect, in some implementations of the third aspect, the terminal device may first determine the type and the quantity of component patterns based on the port quantity, the port density, and the code division multiplexing CDM type, when the type and the quantity of component patterns cannot be determined, the terminal device determines the type and the quantity of component patterns further with reference to a bit quantity included in the second bitmap, and if the type and the quantity of component patterns still cannot be determined, the terminal device determines the type and the quantity of component patterns further with reference to specific content of the second bitmap. However, this is not limited in this embodiment of this application.

According to a fourth aspect, a terminal device is provided. The terminal device is configured to perform the method according to any one of the first aspect or the possible implementations of the first aspect. Specifically, the apparatus includes a unit configured to perform the method according to any one of the first aspect or the possible implementations of the first aspect.

According to a fifth aspect, a network device is provided. The network device is configured to perform the method according to any one of the second aspect or the possible implementations of the second aspect. Specifically, the apparatus includes a unit configured to perform the method according to any one of the second aspect or the possible implementations of the second aspect.

According to a sixth aspect, a terminal device is provided. The terminal device is configured to perform the method according to any one of the third aspect or the possible implementations of the third aspect. Specifically, the apparatus includes a unit configured to perform the method according to any one of the third aspect or the possible implementations of the third aspect.

According to a seventh aspect, another terminal device is provided. The apparatus includes: a transceiver, a memory, and a processor. The transceiver, the memory, and the processor communicate with each other through an internal connection path. The memory is configured to store an instruction. The processor is configured to execute the instruction stored by the memory, to control the receiver to receive a signal and control the transmitter to send a signal. In addition, when the processor executes the instruction stored by the memory, the processor is enabled to perform the method according to any one of the first aspect or the possible implementations of the first aspect.

According to an eighth aspect, another network device is provided. The apparatus includes: a transceiver, a memory, and a processor. The transceiver, the memory, and the processor communicate with each other through an internal connection path. The memory is configured to store an instruction. The processor is configured to execute the instruction stored by the memory, to control the receiver to receive a signal and control the transmitter to send a signal. In addition, when the processor executes the instruction stored by the memory, the processor is enabled to perform the method according to any one of the second aspect or the possible implementations of the second aspect.

According to a ninth aspect, another terminal device is provided. The apparatus includes: a transceiver, a memory, and a processor. The transceiver, the memory, and the processor communicate with each other through an internal connection path. The memory is configured to store an instruction. The processor is configured to execute the instruction stored by the memory, to control the receiver to receive a signal and control the transmitter to send a signal. In addition, when the processor executes the instruction stored by the memory, the processor is enabled to perform the method according to any one of the third aspect or the possible implementations of the third aspect.

According to a tenth aspect, a computer program product is provided. The computer program product includes: computer program code, and when the computer program code is run by a computer, the computer is enabled to perform the method according to the foregoing aspects.

According to an eleventh aspect, a computer-readable medium is provided, configured to store a computer program. The computer program includes an instruction used to perform the method according to the foregoing aspects.

According to a twelfth aspect, a chip system is provided, including a processor. The processor is configured to invoke a computer program from a memory and run the computer program, and the computer program is configured to perform the method according to the foregoing aspects.

DESCRIPTION OF EMBODIMENTS

Figure 1:
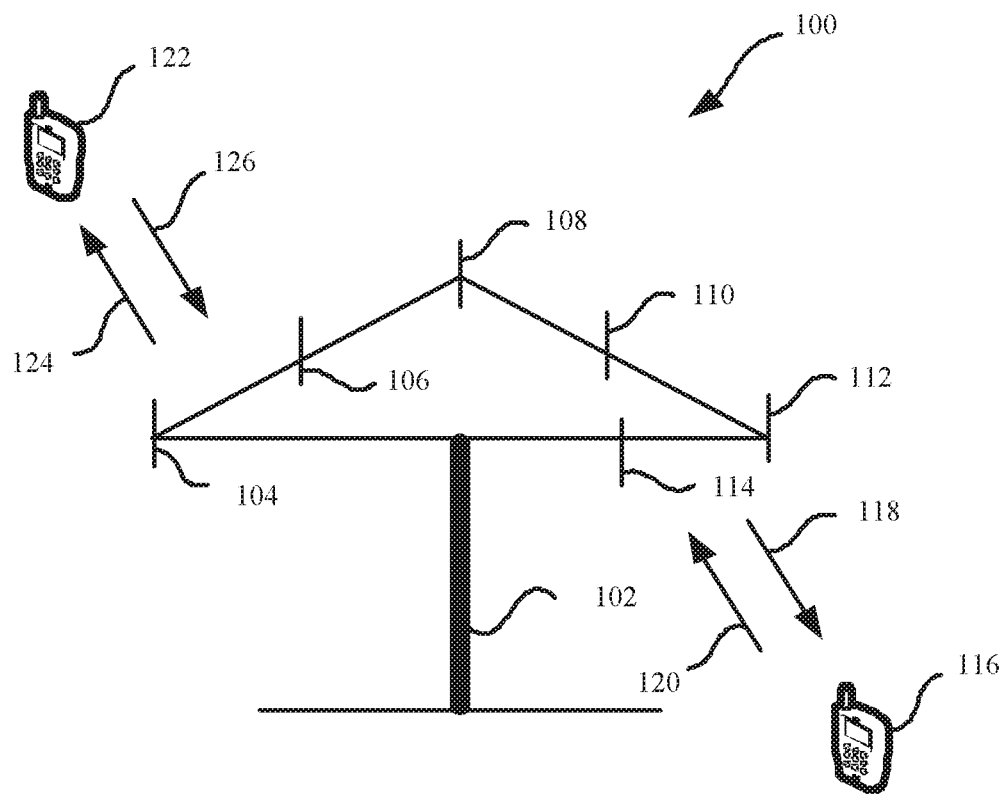
FIG. 1 is a schematic diagram of a communications system according to an embodiment of this application.

The following describes technical solutions in this application with reference to accompanying drawings.

It should be understood that the technical solutions of the embodiments of this application may be applied to various communications systems, such as: a global system for mobile communications (global system for mobile communications. GSM) system, a code division multiple access (code division multiple access, CDMA) system, a wideband code division multiple access (wideband code division multiple access. WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

It should be further understood that the technical solutions in the embodiments of this application may be further applied to various communications systems based on non-orthogonal multiple access technologies, for example, a sparse code multiple access (sparse code multiple access, SCMA) system. Certainly, SCMA may also be referred to as another name in the communications field. Further, the technical solutions in the embodiments of this application may be applied to multicarrier transmission systems using non-orthogonal multiple access technologies, for example, an orthogonal frequency division multiplexing (orthogonal frequency division multiplexing, OFDM) system, a filter bank multi-carrier (filter bank multi-carrier, FBMC) system, a generalized frequency division multiplexing (generalized frequency division multiplexing, GFDM) system, a filtered orthogonal frequency division multiplexing (filtered-OFDM, F-OFDM) system using a non-orthogonal multiple access technology, and the like.

It should also be understood that a terminal device in the embodiments of this application may communicate with one or more core networks through a radio access network (radio access network, RAN). The terminal device may be referred to as an access terminal, user equipment (user equipment, UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (Session Initiation Protocol. SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or a terminal device in a future evolved public land mobile network (Public Land Mobile Network, PLMN).

It should be further understood that in the embodiments of this application, a network device may be configured to communicate with a terminal device. The network device may be a base transceiver station (base transceiver station, BTS) in a GSM system or CDMA system, or may be a node B (node B, NB) in a WCDMA system, or may be an evolved node B (evolved node B, eNB or eNode B) in an LTE system, or the network device may be a relay station, an access point, an in-vehicle device, a wearable device, a network side device in a future 5G network, a network device in a future evolved PLMN network, or the like.

The embodiments of this application may be applied to an LTE system and a subsequent evolved system such as 5G, or other wireless communications system using various wireless access technologies, for example, systems using access technologies such as code division multiple access, frequency division multiple access, time division multiple access, orthogonal frequency division multiple access, and single carrier frequency division multiple access, and are particularly applicable to a scenario in which channel information feedback is required and/or a second-order precoding technology is applied, for example, a wireless network applying a massive MIMO technology and a wireless network applying a distributed antenna technology.

It should be understood that a multiple-input multiple-output (multiple-input multiple-output, MIMO) technology means that a plurality of transmit antennas and receive antennas are respectively used for a transmit end device and a receive end device, so that signals are transmitted and received by the plurality of antennas of the transmit end device and the receive end device, thereby improving communication quality. According to the multiple-input multiple-output technology, a space resource can be fully used and multiple-input multiple-output is implemented by using the plurality of antennas, so that a system channel capacity is multiplied without an increase in spectrum resources and antenna transmit power.

MIMO may be divided into single-user multiple-input multiple-output (single-user MIMO, SU-MIMO) and multi-user multiple-input multiple-output (multi-user MIMO, MU-MIMO). In massive MIMO, hundreds of antennas are deployed on a transmit end device according to a multi-user beamforming principle, to modulate beams for dozens of target receivers, and simultaneously transmit dozens of signals on a same frequency resource through spatial signal isolation. Therefore, according to the massive MIMO technology, a spatial degree of freedom produced by a massive antenna configuration can be fully used, thereby improving spectrum efficiency.

FIG. 1 is a schematic diagram of a communications system according to an embodiment of this application. As shown in FIG. 1, the communications system 100 includes a network device 102, and the network device 102 may include a plurality of antenna groups. Each antenna group may include one or more antennas. For example, an antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices similar to the terminal device 116 or 122. The terminal devices 116 and 122 may be, for example, a cellular phone, a smartphone, a portable computer, a handheld communications device, a handheld computing device, a satellite radio apparatus, a global positioning system, a PDA, and/or any other suitable devices used for communication in the wireless communications system 100.

As shown in FIG. 1, the terminal device 116 communicates with the antennas 112 and 114. The antennas 112 and 114 send information to the terminal device 116 through a forward link 118, and receive information from the terminal device 116 through a reverse link 120. In addition, the terminal device 122 communicates with the antennas 104 and 106. The antennas 104 and 106 send information to the terminal device 122 through a forward link 124, and receive information from the terminal device 122 through a reverse link 126.

For example, in a frequency division duplex FDD system, the forward link 118 may use a frequency band different from that used by the reverse link 120, and the forward link 124 may use a frequency band different from that used by the reverse link 126.

For another example, in a time division duplex TDD system and a full duplex (full duplex) system, the forward link 118 and the reverse link 120 may use a common frequency band, and the forward link 124 and the reverse link 126 may use a common frequency band.

Each group of antennas and/or an area designed for communication is referred to as a sector of the network device 102. For example, an antenna group may be designed to communicate with a terminal device in the sector within coverage of the network device 102. In a process in which the network device 102 communicates with the terminal devices 116 and 122 by using the forward links 118 and 124 respectively, a transmit antenna of the network device 102 may improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102 and the terminal device 116 or the terminal device 122 may be a sending apparatus for wireless communication and/or a receiving apparatus for wireless communication. When sending data, the sending apparatus for wireless communication may encode the data for transmission. Specifically, the wireless communications sending apparatus may obtain a particular quantity of data bits to be sent to a wireless communications receiving apparatus by using a channel. For example, the wireless communications sending apparatus may generate, receive from another communications apparatus, or store in a memory, the particular quantity of data bits to be sent to the wireless communications receiving apparatus by using the channel. Such data bits may be included in a transport block or a plurality of transport blocks of data, and the transport block may be segmented to generate a plurality of code blocks.

In addition, the communications system 100 may be a public land mobile network PLMN network, a device to device (device to device, D2D) network, a machine to machine (machine to machine, M2M) network, or another network. FIG. 1 is only a simplified schematic diagram of an example for ease of understanding. The network may further include another network device, not shown in FIG. 1.

For ease of understanding, the following first briefly describes related terms in this specification.

Resource unit (resource unit): Similar to an RB and an RB pair (RB pair) in an LTE standard, the resource unit may be used as a basic unit used to allocate a resource to a scheduled terminal, or may be used to describe a distribution manner of a plurality of reference signals.

The resource unit may include a plurality of continuous subcarriers in frequency domain and a time interval (time interval, TI) in time domain. In different scheduling processes, the resource unit may have the same or different sizes. The TI herein may be a transmission time interval (transmission time interval, TTI) in an LTE system, or may be a short symbol-level TTI, or a short TTI of a large subcarrier spacing in a high-frequency system, or may be a slot or a mini-slot (mini-slot) in a 5G system, or the like. This is not limited in this application.

Figure 2:
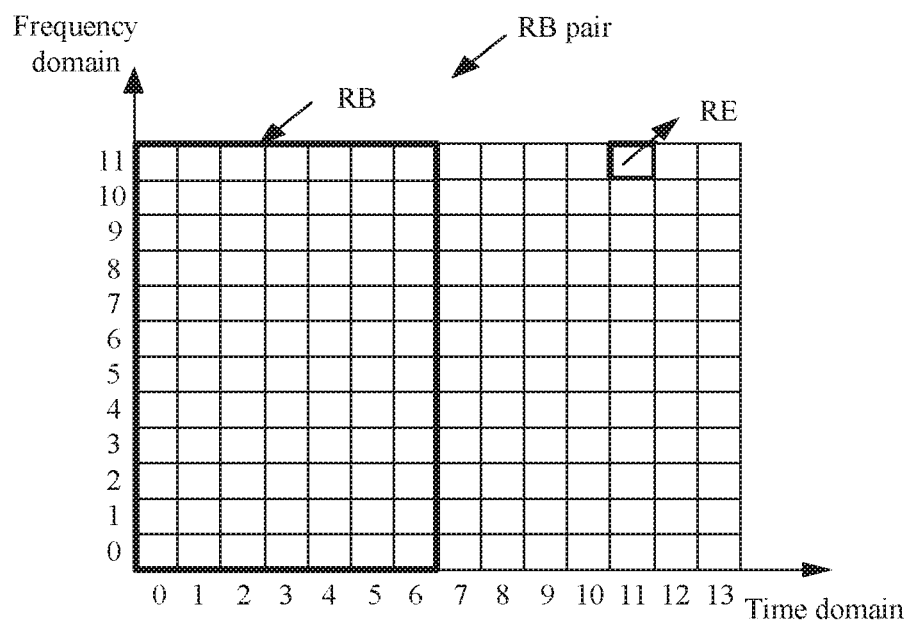
FIG. 2 is a schematic diagram of a resource unit according to an embodiment of this application.

Optionally, a resource unit may include one or more RBs, one or more RB pairs (RB pair), and the like, or may be half an RB. In addition, a resource unit may be further another time frequency resource. This is not limited in this application. An RB pair includes 12 continuous subcarriers in frequency domain and one subframe in time domain. A time frequency resource including a subcarrier in frequency domain and a symbol in time domain is a resource element (resource element, RE), as shown in FIG. 2. An RB pair in FIG. 2 includes 12 continuous subcarriers (numbered as 0 to 11) in frequency domain and 14 symbols (numbered as 0 to 13) in time domain. In FIG. 2, a horizontal coordinate indicates the time domain and a vertical coordinate indicates the frequency domain. It should be noted that in this application, the accompanying drawings indicating a time domain resource are described by using the RB pair shown in FIG. 2 as an example. A person skilled in the art may understand that a specific implementation is not limited thereto.

It should be understood that a "symbol" in this application may include, but is not limited to, any one of the following: an orthogonal frequency division multiplexing (orthogonal frequency division multiplexing, OFDM) symbol, a universal filtered multi-carrier (universal filtered multi-carrier, UFMC) symbol, a filter-band multi-carrier (filter-band multi-carrier, FBMC) symbol, a generalized frequency-division multiplexing (generalized frequency-division multiplexing, GFDM) symbol, and the like.

It should be further understood that for ease of description, symbols included in a resource unit in time domain are continuously numbered from 0, and subcarriers included in frequency domain are numbered from 0. For example, a resource unit is an RB pair, and the RB pair may include symbols 0 to 13 in time domain, and may include subcarriers 0 to 11 in frequency domain. Certainly, a specific implementation is not limited thereto, for example, a resource unit in time domain may include symbols 1 to 14, and may include subcarriers 1 to 12 in frequency domain. It should be noted that the foregoing descriptions are provided for ease of describing the technical solutions provided in the embodiments of this application, instead of limiting the scope of this application.

Component pattern: A component pattern is a time-frequency unit including continuous several subcarriers and continuous several symbols, and is a pattern used to form a reference signal resource. In a resource unit, a pattern of a reference signal may include one component pattern, or may include a plurality of component patterns. The terminal device may determine, based on a component pattern corresponding to a reference signal and a time frequency resource occupied by at least one component pattern, a time frequency resource occupied in a physical layer transmission unit by the reference signal. A reference signal resource may be flexibly configured based on a combination of component patterns.

In a possible implementation, the component pattern is also referred to as a "component pattern" or a "component", and is indicated by a component (X, Y). X and Y are both integers greater than or equal to 1, X is used to indicate a quantity of continuous subcarriers occupied in a resource unit by a component pattern, and Y is used to indicate a quantity of continuous symbols occupied in the resource unit by the component pattern. Optionally, the component (X, Y) may be (2, 1), (4, 1), or (2, 2), and this depends on a configuration of a network device. This is not limited in the embodiments of this application.

Figure 3:
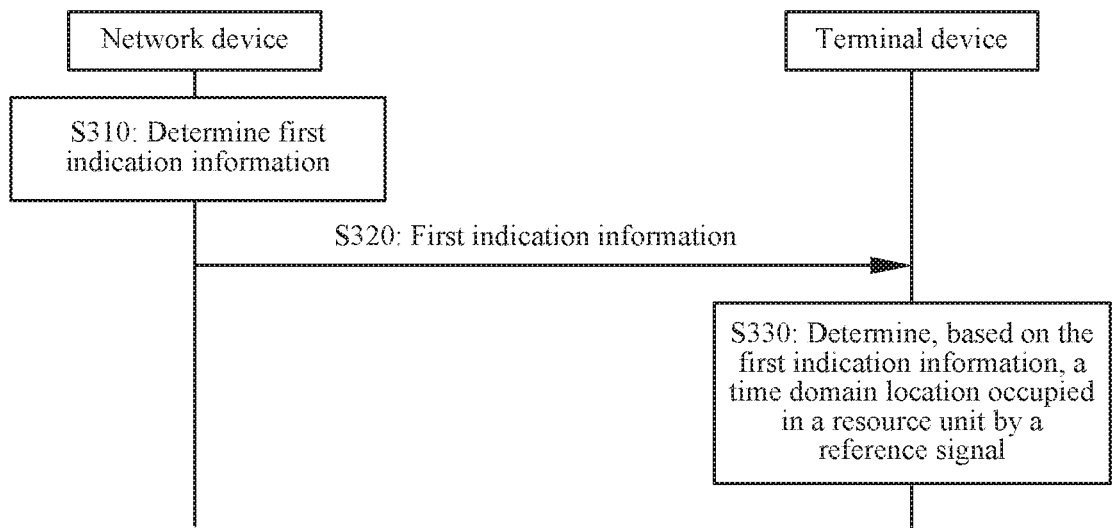
FIG. 3 is a schematic flowchart of a resource indication method according to an embodiment of this application.

FIG. 3 is a schematic flowchart of a resource indication method 300 according to an embodiment of this application. The method 300 may be applied to the communications system 100 shown in FIG. 1, but this embodiment of this application is not limited thereto.

S310: A network device determines first indication information, where the first indication information is used to indicate a time domain location occupied in a resource unit by a component pattern of a reference signal.

S320: The network device sends the first indication information to a terminal device, and correspondingly, the terminal device receives the first indication information sent by the network device.

S330: The terminal device determines, based on the first indication information, the time domain location occupied in the resource unit by the reference signal.

Specifically, the network device may determine the first indication information used to indicate the time domain location occupied in the resource unit by the component pattern (that is, component pattern) of the reference signal, and send the first indication information to the terminal device. The terminal device receives the first indication information, and determines, based on the first indication information, the time domain location occupied in the resource unit by the reference signal. Optionally, the first indication information may be carried in Radio Resource Control (Radio Resource Control, RRC) signaling.

Further, the terminal device may further determine a frequency domain location occupied in the resource unit by the reference signal. After determining the time domain location and the frequency domain location occupied in the resource unit by the reference signal, the terminal device may send a reference signal to the network device, or receive a reference signal sent by the network device. Because the time domain location and the frequency domain location of the reference signal are configured for the terminal device by the network device, the terminal device may receive and process the reference signal in a correct location, and complete channel estimation.

It should be understood that the terminal device may obtain different time domain locations in different mapping modes, and the terminal device may determine a time-frequency location occupied in the resource unit by each component pattern of the reference signal, to finally determine a time-frequency location occupied in the resource unit by the reference signal. It should be further understood that in this embodiment of this application, there may be one or more component patterns of the reference signal. This is not limited in this embodiment of this application.

In the resource indication method in this embodiment of this application, the network device sends, to the terminal device, the indication information used to indicate the time domain location occupied in the resource unit by the component pattern of the reference signal, so that the terminal device can determine, based on the indication information, the time domain location occupied in the resource unit by the reference signal, to help implement a plurality of different mapping modes of the reference signal and correct channel estimation, and improve data transmission efficiency.

In an optional embodiment, the first indication information includes any one piece of the following information:

a start symbol location occupied in the resource unit by the component pattern, an offset of the start symbol location relative to a reference symbol, an index of a symbol occupied in the resource unit by the component pattern, and a first bitmap, where the first bitmap is used to indicate a symbol occupation status of the component pattern in the resource unit.

Specifically, the first indication information is used to indicate the time domain location occupied in the resource unit by the component pattern, and may be specifically any one piece of the following information:

(1) A start symbol location occupied in the resource unit by the component pattern.

The start symbol location may be specifically an index of a start symbol occupied in the resource unit by the component pattern. Optionally, the component pattern of the reference signal includes at least two component patterns, and symbol locations occupied in the resource unit by the at least two component patterns are noncontiguous. The first indication information includes: the start symbol location occupied in the resource unit by each of the at least two component patterns.

Specifically, when the pattern of the reference signal includes the at least two component patterns that occupy noncontiguous symbol locations in the resource unit, the first indication information needs to indicate the start symbol location of each of the at least two component patterns. For example, in FIG. 5, a reference signal includes 6 components (2, 2). There are 2 columns in total and each column includes 3 components. 3 components (2, 2) in the first column and a component (2, 2) in the other column are noncontiguous in time domain, that is, there are two discrete time domain start locations. In this case, the first indication information may be 5 and 9, separately indicating two time domain start locations, so that the terminal device determines a time domain location of each component pattern. For another example, in FIG. 6, a reference signal includes 6 components (2, 2). There are 2 columns in total and each column includes 3 components. 3 components (2, 2) in the first column and a component (2, 2) in the other column are continuous in time domain. In this case, the first indication information may be 5, indicating only one time domain start location, so that the terminal device may determine a time domain location of each component pattern based on the time domain start location.

It should be understood that the terminal device may determine, in another manner, a type and a quantity of component patterns carried in the resource unit, and determine a quantity of component patterns in each column. In this way, a specific distribution status of the reference signal in time domain may be determined with reference to the time domain start location of the component pattern that is indicated to the terminal device by the network device. However, this is not limited in this embodiment of this application.

In an optional embodiment, the first indication information includes the start symbol location occupied in the resource unit by each component pattern; or the first indication information includes a start symbol location set, and the start symbol location set includes the start symbol location occupied in the resource unit by each component pattern; or the first indication information includes an index of the start symbol location set.

Figure 5:
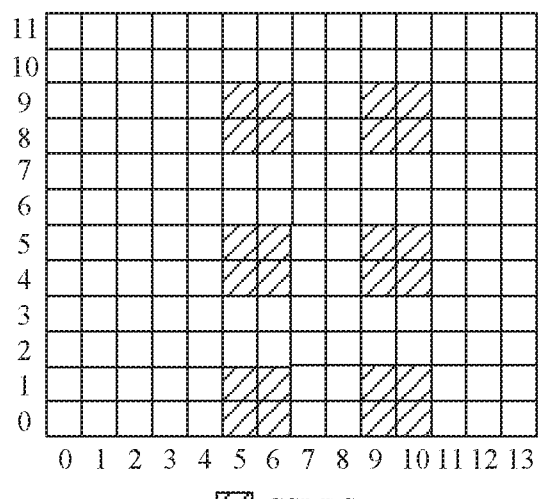
FIG. 5 is a schematic diagram of a CSI-RS pattern according to an embodiment of this application.

Specifically, the first indication information may be directly an index of a start symbol of the component pattern, or may be the start symbol location set (or an array), or may be the index of the start symbol location set. This is not limited in this embodiment of this application. When the index of the start symbol location set is used to indicate the start symbol of the component pattern, a plurality of start symbol location sets may be configured and numbered, to facilitate indication by the network device. For example, there are three start symbol location sets {5, 8}, {5, 9}, and {5, 10}, and indexes of the start symbol location sets are sequentially 0, 1, and 2. In FIG. 5, the first indication information may be directly two values of 5 and 9, or the first indication information may be a set or an array that includes two symbol locations 5 and 9, or the first indication information may be the index 1 of the set {5, 9}. The terminal device may determine the corresponding start symbol location set {5, 9} based on the index 1, to further determine the time domain location occupied by the reference signal.

In a possible implementation, the first indication information includes the following fields, including one or two integers. firstOFDMSymbolInTimeDomain-1 is used to indicate a time domain start location, and firstOFDMSymbolInTimeDomain-2 is used to indicate another time domain start location (optional).

| resourceMapping | SEQUENCE { | |
|---|---|---|
| ... | | |
| firstOFDMSymbolInTimeDomain-1 | INTEGER (0..13) | |
| firstOFDMSymbolInTimeDomain-2 | INTEGER (0..13) | OPTIONAL, |
| ... | | |
| }. | | |

(2) An offset of the start symbol location relative to a reference symbol.

To be specific, the time domain location of the component pattern is indicated by using a relative distance between symbols or a relative distance between component patterns in time domain.

It should be understood that the reference symbol may be any symbol in the resource unit, the initial symbol or the last symbol of a component pattern of any reference signal, or the like. One or more reference symbols may be provided. This is not limited in this embodiment of this application. In addition, the reference symbol may be agreed on in advance in a protocol, or may be configured for the terminal device by the network device through signaling. This is not limited in this embodiment of this application.

When the pattern of the reference signal includes only continuous component patterns in time domain, the first indication information may indicate only an offset between a time domain start location of the continuous component patterns and the reference symbol. For example, in FIG. 6, assuming that the reference symbol is a symbol 7 in the middle, the first indication information may carry an offset between the time domain start location of the component pattern relative to the symbol 7, that is, an offset of 5 relative to 7 is −2. Assuming that the reference symbol is 5, the first indication information may carry an offset 0 of 5 relative to 5. This is not limited in this embodiment of this application.

When the pattern of the reference signal includes at least two noncontiguous component patterns in time domain, the first indication information needs to separately indicate time domain locations of the noncontiguous component patterns. In a possible implementation, the pattern of the reference signal includes a first component pattern and a second component pattern, and the first component pattern and the second component pattern are noncontiguous in time domain. The network device and the terminal device may use the first symbol and the last symbol of the first component pattern as the reference symbol. The first indication information carries an offset of the initial symbol of the first component pattern relative to the first symbol and an offset of a start symbol location of the second component pattern relative to the last symbol of the first component pattern. This is not limited in this embodiment of this application. For example, in FIG. 5, the symbol 0 and the symbol 6 are used as the reference symbol, 0 is the first symbol, and 6 is the last symbol of the first component pattern. The first indication information includes an offset 5 and an offset 3. The terminal device may first determine that time domain locations of the first component pattern are 5 and 6, and then determine that time domain locations of the second component pattern are 9 and 10.

In a possible implementation, the first indication information includes the following fields. OFDMSymbolInTimeDomain-set1 includes two integers used to indicate offsets that are separately Delta 1 and Delta 2.

| resourceMapping | SEQUENCE { | |
|---|---|---|
| ... | | |
| OFDMSymbolInTimeDomain-set1 | SEQUENCE { | |
| | Delta1 | INTEGER (0..13) |
| | Delta2 | INTEGER (0..13)} |
| ... | | |
| }. | | |

(3) An index of a symbol occupied in the resource unit by the component pattern.

That is, the time domain location of the component pattern in the resource unit is directly indicated by using a specific symbol index. For example, in FIG. 5, the first indication information may include four symbols 5, 6, 9, and 10; in FIG. 6, the first indication information may include four symbols 5, 6, 7, and 8.

In a possible implementation, the first indication information includes the following fields. OFDMSymbolInTimeDomain-set1 includes four integers. Symbol-1, Symbol-2, Symbol-3, and Symbol-4 are separately used to indicate symbol indexes of four symbols:

| resourceMapping | SEQUENCE { | |
|---|---|---|
| ... | | |
| OFDMSymbolInTimeDomain-set1 | SEQUENCE { | |
| | Symbol-1 | INTEGER (0..13) |
| | Symbol-2 | INTEGER (0..13) |
| | Symbol-3 | INTEGER (0..13) |
| | Symbol-4 | INTEGER (0..13)} |
| ... | | |
| }(4) First bitmap. | | |

The first bitmap is used to indicate a time domain occupation status of the reference signal in the resource unit, or may be referred to as a "time domain bitmap", and may specifically include 14 bits. Each bit corresponds one-to-one to a symbol in time domain. 1 indicates that a symbol is occupied and 0 indicates that a symbol is not occupied, or 0 indicates that a symbol is occupied and 1 indicates that a symbol is not occupied. This is not limited in this embodiment of this application. For example, assuming that 1 indicates that a symbol is occupied and 0 indicates that a symbol is not occupied, in FIG. 5, the first indication information may be 00000110011000, and in FIG. 6, the first indication information may be 00000111100000.

In a possible implementation, the first indication information includes the following fields. TimeDomainAllocation includes 14 bits, and each bit corresponds one-to-one to a symbol in time domain.

| | |
|---|---|
| resourceMapping | SEQUENCE { |
| ... | |
| timeDomainAllocation | BIT STRING (SIZE (14)) |
| ... | |
| }. | |

It should be understood that the foregoing four different indication manners can directly or indirectly indicate the time domain location occupied by the reference signal in the resource unit to the terminal device. A specific indication manner may be agreed on in advance in a protocol, or may be configured for the terminal device by the network device through signaling. This is not limited in this embodiment of this application.

In the resource indication method in this embodiment of this application, the network device may indicate, to the terminal device in different manners, the time domain location occupied in the resource unit by the component pattern of the reference signal, so that the terminal device can correctly distinguish a plurality of different mapping modes based on the indication information, and determine the time domain location occupied by the reference signal in the resource unit, to help implement correct channel estimation and improve data transmission efficiency.

In a possible implementation, the terminal device may determine the time domain location occupied by the reference signal by using the first indication information, and determine the frequency domain location of the reference signal by using the second bitmap. The first indication information may include two integers or may include 14 bits. The second bitmap may also be referred to as a "frequency domain bitmap", and includes a bit quantity of 12/X, where X is a quantity of continuous subcarriers in a component (X, Y). This is because the component pattern can only use a fixed mapping mode in frequency domain, that is, a frequency domain location of the reference signal can be only a multiple of X. For example, for a component (2, 2), there are only six possible frequency domain locations that are separately 0, 2, 4, 6, 8, and 10. Therefore, a 6-bit bitmap may be used. For a component (4, 1), there are only three possible frequency domain locations that are separately 0, 4, and 8. Therefore, a 3-bit bitmap may be used.

In an optional embodiment, before the determining, by the terminal device based on the first indication information, the time domain location occupied by the reference signal in the resource unit, the method further includes:

receiving, by the terminal device, second indication information sent by the network device, where the second indication information is used to indicate at least one piece of the following information used by the network device to send the reference signal: a port quantity, a port density, a frequency domain location occupied in the resource unit by the component pattern, and a code division multiplexing CDM type; and determining, by the terminal device, a type and a quantity of component patterns based on the second indication information and a first mapping relationship, where the first mapping relationship is used to indicate a correspondence between the second indication information and the type and the quantity of component patterns; and the determining, by the terminal device based on the first indication information, the time domain location occupied in the resource unit by the reference signal includes:

determining, by the terminal device based on the first indication information and the type and the quantity of component patterns, the time domain location occupied in the resource unit by the reference signal.

Specifically, the terminal device may receive the second indication information sent by the network device, and determine, based on the second indication information, at least one of the port quantity, the port density, the frequency domain location occupied in the resource unit by the component pattern, and the CDM type that are used by the network device to send the reference signal. The terminal device may determine the type and the quantity of component patterns based on at least one of the port quantity, the port density, the frequency domain location of the component pattern, and the CDM type used by the network device to send the reference signal, and the first mapping relationship. The terminal device then determines, with reference to the first indication information, the time domain location occupied in the resource unit by the reference signal. Optionally, the second indication information may be carried in Radio Resource Control (Radio Resource Control, RRC) signaling.

It should be understood that if the first indication information is used to indicate the start symbol location occupied in the resource unit by the component pattern, the terminal device may determine, based on the start symbol location occupied in the resource unit by the component pattern and the type and the quantity of component patterns, the time domain location occupied in the resource unit by the reference signal; if the first indication information is used to indicate the offset of the start symbol location relative to the reference symbol, the terminal device may determine, based on the offset of the start symbol location relative to the reference symbol and the type and the quantity of component patterns, the time domain location occupied in the resource unit by the reference signal; if the first indication information is used to indicate the index of the symbol occupied in the resource unit by the component pattern, the terminal device may determine, based on the index of the symbol occupied in the resource unit by the component pattern and the type and the quantity of component patterns, the time domain location occupied in the resource unit by the reference signal; and if the first indication information is used to indicate the first bitmap, the terminal device may determine, based on the first bitmap and the type and the quantity of component patterns, the time domain location occupied in the resource unit by the reference signal.

In an optional embodiment, the reference signal is a channel state information reference signal CSI-RS.

Figure 4:
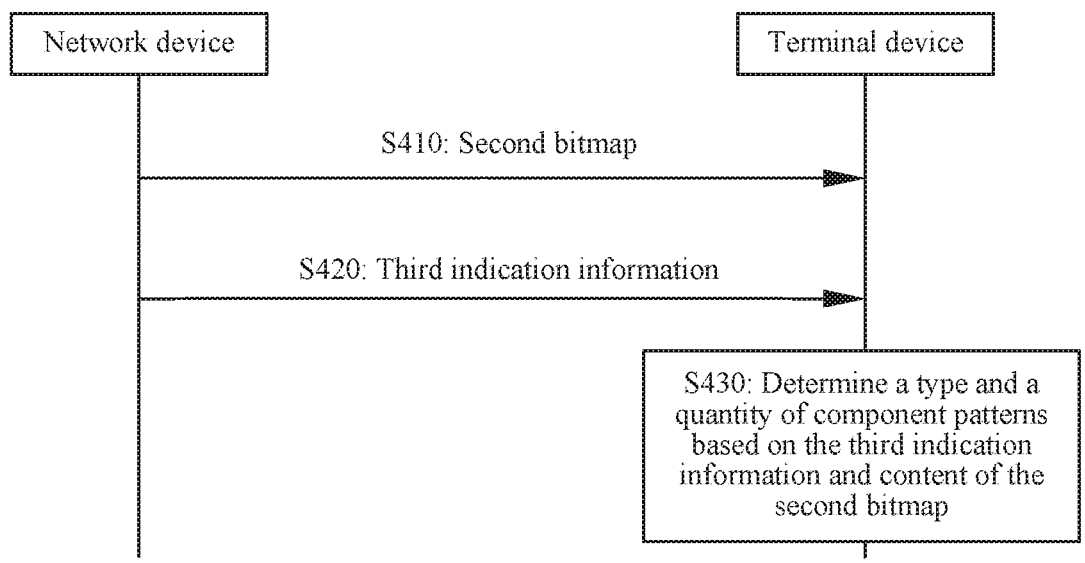
FIG. 4 is a schematic flowchart of another resource indication method according to an embodiment of this application.

FIG. 4 is a schematic flowchart of another resource indication method 400 according to an embodiment of this application. The method 400 may be applied to the communications system 100 shown in FIG. 1, but this embodiment of this application is not limited thereto.

S410: A network device sends a second bitmap to a terminal device, and correspondingly, the terminal device receives the second bitmap sent by the network device, where the second bitmap is used to indicate a frequency domain occupation status of a component pattern of a reference signal in a resource unit.

S420: The network device sends third indication information to the terminal device, and correspondingly, the terminal device receives the third indication information sent by the network device, where the third indication information is used to indicate at least one piece of the following information used by the network device to send the reference signal: a port quantity, a port density, and a code division multiplexing CDM type.

S430: The terminal device determines a type and a quantity of component patterns based on the third indication information and a length and content of the second bitmap.

Specifically, the terminal device may determine the type and the quantity of component patterns of the reference signal with reference to third indication information used to indicate the port quantity, the port density, and the code division multiplexing CDM type and the length and the content of the second bitmap used to indicate the frequency domain occupation status of the component pattern of the reference signal in the resource unit. This is because in some cases, the terminal device cannot determine the type and the quantity of component patterns based only on the second indication information, and can distinguish different types and quantities of component patterns with reference to the length and the content of the second bitmap. The content of the second bitmap may be a value of each specific bit, or may be a quantity of occupied subcarriers, or may be a quantity of unoccupied subcarriers. This is not limited in this embodiment of this application.

It should be understood that the second bitmap may also be referred to as a "frequency domain bitmap", and includes a bit quantity of 12/X, where X is a quantity of continuous subcarriers in a component (X, Y). This is because the component pattern can only use a fixed mapping mode in frequency domain, that is, a frequency domain location of the reference signal can be only a multiple of X. For example, for a component (2, 2), there are only six possible frequency domain locations that are separately 0, 2, 4, 6, 8, and 10. Therefore, a 6-bit bitmap may be used. For a component (4, 1), there are only three possible frequency domain locations that are separately 0, 4, and 8. Therefore, a 3-bit bitmap may be used.

Further, after determining the type and the quantity of component patterns of the reference signal, the terminal device may determine the time domain location and the frequency domain location of the component pattern of the reference signal based on other information, and the terminal device then may send a reference signal to the network device, or receive a reference signal sent by the network device. Because the time domain location and the frequency domain location of the reference signal are configured for the terminal device by the network device, the terminal device may receive and process the reference signal in a correct location, and complete channel estimation.

In the resource indication method in this embodiment of this application, the terminal device determines the type and the quantity of component patterns with reference to bitmap content used to indicate the frequency domain occupation status of the component pattern, and therefore can determine the time domain location and a frequency domain location occupied in the resource unit by the reference signal, to help implement correct channel estimation and improve data transmission efficiency.

Optionally, the terminal device may first determine the type and the quantity of component patterns based on the port quantity, the port density, and the code division multiplexing CDM type, when the type and the quantity of component patterns cannot be determined, the terminal device determines the type and the quantity of component patterns further with reference to a bit quantity included in the second bitmap, and if the type and the quantity of component patterns still cannot be determined, the terminal device determines the type and the quantity of component patterns further with reference to specific content of the second bitmap. However, this is not limited in this embodiment of this application.

The following describes this application in detail with reference to a specific embodiment.

The network device and the terminal device may separately preconfigure the following Table 1. In Table 1, the first column is an index of a row (Row), the second column is a port quantity (Ports), the third column is a port density (Density), and the fourth column $(\bar{k},\bar{l})$, the fifth column k', and the sixth column l' jointly indicate a location of a reference signal in a resource unit. A frequency domain location is $k=\bar{k}+k'$ and a time domain location is $l=\bar{l}+l'$, $k_0,k_1,k_2,k_3$, separately indicate frequency domain start locations configured for the terminal device by the network device, and $l_0,l_1$ separately indicate time domain start locations configured for the terminal device by the network device. There are at least $k_0$ and $l_0$, and $k_1,k_2,k_3$ and $l_1$ may depend on different mapping modes and cases.

Specifically, the network device may send ports, density, the CDM type, frequency domain indication information (that is, the second bitmap), and time domain indication information (that is, the first indication information) to the terminal device. The terminal device may first search the table based on the ports, the density, and the CDM type, determine a corresponding row in Table 1, then calculate the type and the quantity of component patterns based on $(\bar{k},\bar{l})$, k', and l' corresponding to the row, and finally determine the time-frequency location of the reference signal with reference to the frequency domain indication information and the time domain indication information.

For example, if Ports=2, Density=1,0.5, and CDM type=FD-CDM2, the terminal device may search the table to determine a row 3, where $(\bar{k},\bar{l})=(k_0,l_0)$, $k=k_0+0,k_0+1$, and $l=l_0$. That is, the component pattern is a component (2, 1), there is only one component pattern, and one symbol is occupied. The terminal device then may determine the time-frequency location of the reference signal with reference to the frequency domain indication information including 6 bits and time domain indication information including an integer.

For another example, if Ports=4, Density=1, and CDM type=FD-CDM2, the terminal device may search the table to determine a row 4 and a row 5. In the row 4, $(\bar{k},\bar{l})=(k_0,l_0)$, $(k_0+2,l_0)$ $k=k_0+0,k_0+1$, $k_0+2,k_0+3$, and $l=l_0$, that is, the component pattern is a component (4, 1), there is only one component pattern, and one symbol is occupied. In the row 5, $(\bar{k},\bar{l})=(k_0,l_0),(k_0,l_0+1)$ $k=k_0+0,k_0+1$, and $l=l_0+0,l_0+1$, that is, the component pattern is a component (2, 2), there is only one component pattern, and two continuous symbols are occupied. Because a bit quantity included in the second bitmap is related to the type of the component pattern, the terminal device may determine the type of the component pattern based on the bit quantity included in the second bitmap. To be specific, in the row 4, the component pattern is a component (4, 1) and a corresponding bit quantity of the second bitmap is three bits, and in the row 5, the component pattern is a component (2, 2) and a corresponding bit quantity of the second bitmap is six bits. Therefore, when the specific component pattern cannot be determined based on the Ports, the Density, and the CDM type, the terminal device may determine, with reference to the bit quantity included in the second bitmap, the type of the component pattern, that is, determine a row in Table 1 that should be used. Next, the terminal device then may determine the time-frequency location of the reference signal with reference to the frequency domain indication information and the time domain indication information.

For another example, if Ports=8, Density=1, and CDM type=FD-CDM2, the terminal device may search the table to determine a row 7 and a row 8. In the row 7, ($\bar{k},\bar{l}$)=($k_0,l_0$),($k_1,l_0$),($k_2,l_0$),($k_3,l_0$), $k=k_0+0,k_0+1,k_1+0,k_1+1,k_2+0,k_2+1,k_3+0,k_3+1$, and $l=l_0$ In this case, the component pattern is a component (2,1), there are four component patterns, there is only one column, and one symbol is occupied. In the row 8, ($\bar{k},\bar{l}$)=($k_0,l_0$),($k_1,l_0$),($k_0,l_0+1$),($k_1,l_0+1$) $k=k_0+0,k_0+1,k_1+0,k_1+1$, and $l=l_0+0,l_0+1$. In this case, the component pattern is a component (2, 2), there are four component patterns, and two continuous symbols are occupied, that is, there are two columns and each column includes two component patterns. Because frequency domain indicators X of the component patterns are all equal to 2, that is, in the row 7 and the row 8, the second bitmap includes six bits, the terminal device cannot determine a specific type of the component pattern based only on the bit quantity of the second bitmap. In this case, the terminal device may determine the type of the component pattern with reference to content of the second bitmap. In the row 7, because one column includes four component patterns, a quantity of subcarriers occupied in the second bitmap should be 4. In the Row 8, because one column includes two component patterns, a quantity of subcarriers occupied in the second bitmap should be 2. If 1 indicates occupied and 0 indicates unoccupied, the second bitmap corresponding to the row 7 includes four Is and the second bitmap corresponding to the row 8 includes two is, and the terminal device may determine, based on the content of the second bitmap, to use the row 7 or the row 8, and further determine the type of the component pattern. Next, the terminal device then may determine the time-frequency location of the reference signal with reference to the frequency domain indication information and the time domain indication information.

Figure 6:
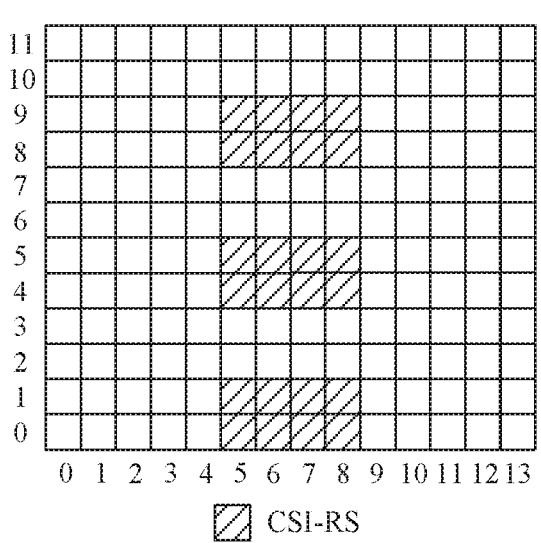
FIG. 6 is a schematic diagram of another CSI-RS pattern according to an embodiment of this application.

For another example, in a row 14 and a row 15, six components (2, 2) may be determined by using the foregoing method, and each column includes three components. In frequency domain, the frequency domain indication information, that is, the second bitmap, may include six bits, and correspondingly may be specifically 101010 (1 indicates occupied and 0 indicates unoccupied) in FIG. 5 and FIG. 6. In time domain, there may be two different mapping modes shown in FIG. 5 and FIG. 6. The component pattern shown in FIG. 5 is placed in time domain in a noncontiguous manner, and the component pattern shown in FIG. 6 is continuously placed in time domain. In FIG. 6, the time domain indication information needs to indicate only the symbol 5, and the terminal device may determine the time domain location occupied by the reference signal based on the component (2, 2) and the symbol 5. In FIG. 5, the time domain indication information needs to indicate locations of two initial symbols of the symbol 5 and the symbol 9, so that the terminal device determines the mapping mode shown in FIG. 5.

Figure 7:
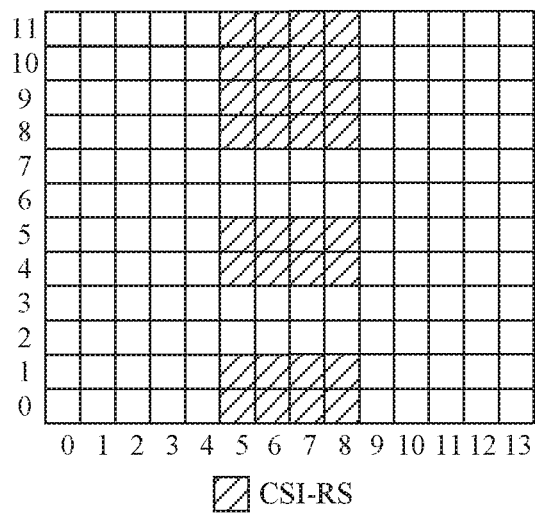
FIG. 7 is a schematic diagram of another CSI-RS pattern according to an embodiment of this application.
Figure 8:
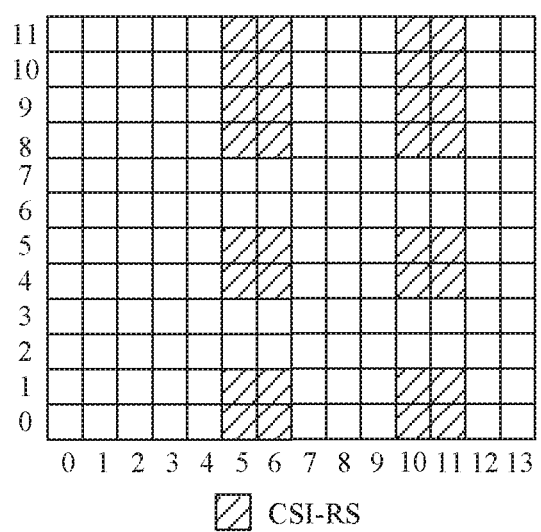
FIG. 8 is a schematic diagram of another CSI-RS pattern according to an embodiment of this application.

For another example, in a row 17 and a row 18, eight components (2, 2) may be determined by using the foregoing method, and each column includes four components. In frequency domain, the frequency domain indication information, that is, the second bitmap, may include six bits, and correspondingly may be specifically 101011 (1 indicates occupied and 0 indicates unoccupied) in FIG. 7 and FIG. 8. In time domain, there may be two different mapping modes shown in FIG. 7 and FIG. 8. The component pattern shown in FIG. 7 is continuously placed in time domain, and the component pattern shown in FIG. 8 is placed in time domain in a noncontiguous manner. In FIG. 7, the time domain indication information needs to indicate only the symbol 5, and the terminal device may determine the time domain location occupied by the reference signal based on the component (2, 2) and the symbol 5. In FIG. 8, the time domain indication information needs to indicate locations of two initial symbols of the symbol 5 and the symbol 10 (or indicate a set (5, 101), so that the terminal device determines the mapping mode shown in FIG. 8.

TABLE 1

Location of a CSI-RS in a resource unit

| Row | Ports | Density | CDMtype | ($\bar{k}$, $\bar{l}$) | k' | l' |
|---|---|---|---|---|---|---|
| 1 | 1 | 3 | No CDM | ($k_0$, $l_0$), ($k_0$ + 4, $l_0$), ($k_0$ + 8, $l_0$) | 0 | 0 |
| 2 | 1 | 1, 0.5 | No CDM | ($k_0$, $l_0$) | 0 | 0 |
| 3 | 2 | 1, 0.5 | FD-CDM2 | ($k_0$, $l_0$) | 0, 1 | 0 |
| 4 | 4 | 1 | FD-CDM2 | ($k_0$, $l_0$), ($k_0$ + 2, $l_0$) | 0, 1 | 0 |
| 5 | 4 | 1 | FD-CDM2 | ($k_0$, $l_0$), ($k_0$, $l_0$ + 1) | 0, 1 | 0 |
| 7 | 8 | 1 | FD-CDM2 | ($k_0$, $l_0$), ($k_1$, $l_0$), ($k_2$, $l_0$), ($k_3$, $l_0$) | 0, 1 | 0 |
| 8 | 8 | 1 | FD-CDM2 | ($k_0$, $l_0$), ($k_1$, $l_0$), ($k_0$, $l_0$ + 1), ($k_1$, $l_0$ + 1) | 0, 1 | 0 |
| 9 | 8 | 1 | CDM4 (FD2, TD2) | ($k_0$, $l_0$), ($k_1$, $l_0$) | 0, 1 | 0, 1 |
| 10 | 12 | 1 | FD-CDM2 | ($k_0$, $l_0$), ($k_1$, $l_0$), ($k_2$, $l_0$), ($k_3$, $l_0$), ($k_4$, $l_0$), ($k_5$, $l_0$) | 0, 1 | 0 |

TABLE 1-continued

Location of a CSI-RS in a resource unit

| Row | Ports | Density | CDMtype | $(\bar{k}, \bar{l})$ | k' | l' |
|---|---|---|---|---|---|---|
| 11 | 12 | 1 | CDM4 (FD2, TD2) | $(k_0, l_0), (k_1, l_0), (k_2, l_0)$ | 0, 1 | 0, 1 |
| 12 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1 | 0 |
| 13 | 16 | 1, 0.5 | CDM4 (FD2, TD2) | $(k_0, l_0), (k_1, l_0), (k_2, l_0), (k_3, l_0)$ | 0, 1 | 0, 1 |
| 14 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_1 + 1), (k_1, l_1 + 1), (k_2, l_1 + 1)$ | 0, 1 | 0 |
| 15 | 24 | 1, 0.5 | CDM4 (FD2, TD2) | $(k_0, l_0), (k_1, l_0), (k_2, l_0), (k_0, l_1), (k_1, l_1), (k_2, l_1),$ | 0, 1 | 0, 1 |
| 16 | 24 | 1, 0.5 | CDM8 (FD2, TD4) | $(k_0, l_0), (k_1, l_0), (k_2, l_0)$ | 0, 1 | 0, 1, 2, 3 |
| 17 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1 | 0 |
| 18 | 32 | 1, 0.5 | CDM4 (FD2, TD2) | $(k_0, l_0), (k_1, l_0), (k_2, l_0), (k_3, l_0),$ $(k_0, l_1), (k_1, l_1), (k_2, l_1), (k_3, l_1),$ | 0, 1 | 0, 1 |
| 19 | 32 | 1, 0.5 | CDM8 (FD2, TD4) | $(k_0, l_0), (k_1, l_0), (k_2, l_0), (k_3, l_0)$ | 0, 1 | 0, 1, 2, 3 |

It should be understood that a type and a quantity of component patterns in another row are determined in a manner similar to the foregoing manner, and details are not described herein again.

It should be understood that sequence numbers of the foregoing processes do not mean a sequence of performing the processes. The sequence of performing the processes should be determined according to functions and internal logic of the processes, and should not be construed as any limitation on the implementation processes of the embodiments of this application.

The foregoing describes the resource indication methods based on the embodiments of this application in detail with reference to FIG. 1 to FIG. 8, and the following describes terminal devices and network devices in the embodiments of this application in detail with reference to FIG. 9 to FIG. 14.

Figure 9:
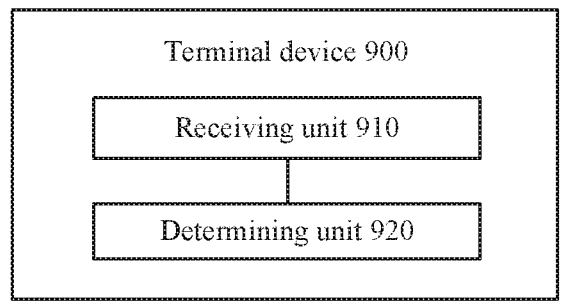
FIG. 9 is a schematic block diagram of a terminal device according to an embodiment of this application.

FIG. 9 shows a terminal device 900 according to an embodiment of this application. The terminal device 900 includes: a receiving unit 910, configured to receive first indication information sent by a network device, where the first indication information is used to indicate a time domain location occupied in a resource unit by a component pattern of a reference signal; and a determining unit 920, configured to determine, based on the first indication information, the time domain location occupied in the resource unit by the reference signal.

In this embodiment of this application, the network device sends, to the terminal device, the indication information used to indicate the time domain location occupied in the resource unit by the component pattern of the reference signal, so that the terminal device can determine, based on the indication information, the time domain location occupied in the resource unit by the reference signal, to help implement a plurality of different mapping modes of the reference signal and correct channel estimation, and improve data transmission efficiency.

Optionally, the first indication information includes any one piece of the following information: a start symbol location occupied in the resource unit by the component pattern, an offset of the start symbol location relative to a reference symbol, an index of a symbol occupied in the resource unit by the component pattern, and a first bitmap, where the first bitmap is used to indicate a symbol occupation status of the component pattern in the resource unit.

Optionally, the reference signal includes at least two component patterns, and symbol locations occupied in the resource unit by the at least two component patterns are noncontiguous; and the first indication information is used to indicate a start symbol location occupied in the resource unit by each of the at least two component patterns.

Optionally, the first indication information includes the start symbol location occupied in the resource unit by each component pattern; or the first indication information includes a start symbol location set, and the start symbol location set includes the start symbol location occupied in the resource unit by each component pattern; or the first indication information includes an index of the start symbol location set.

Optionally, the receiving unit 910 is further configured to: before the time domain location occupied by the reference signal in the resource unit is determined based on the first indication information, receive second indication information sent by the network device, where the second indication information is used to indicate at least one piece of the following information used by the network device to send the reference signal: a port quantity, a port density, a frequency domain location occupied in the resource unit by the component pattern, and a code division multiplexing CDM type; and the determining unit 920 is specifically configured to: determine a type and a quantity of component patterns based on the second indication information and a first mapping relationship, where the first mapping relationship is used to indicate a correspondence between the second indication information and the type and the quantity of component patterns: and determine, based on the first indication information and the type and the quantity of component patterns, the time domain location occupied in the resource unit by the reference signal.

Optionally, the reference signal is a channel state information reference signal CSI-RS.

It should be understood that the terminal device 900 herein is indicated in a form of the functional units. The term "unit" herein may refer to an application-specific integrated circuit (Application Specific Integrated Circuit, ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that the terminal device 900 may be specifically the terminal device in the foregoing embodiments, and the terminal device 900 may be configured to perform the procedures and/or the steps corresponding to the terminal device in the foregoing method embodiment 300. To avoid repetition, details are not described again herein.

Figure 10:
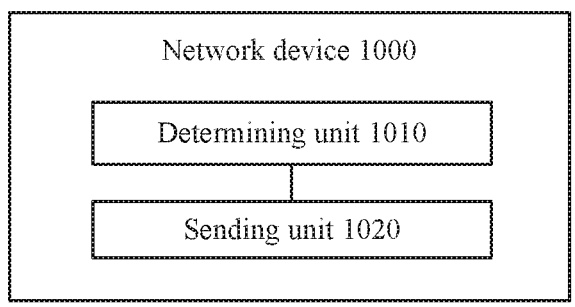
FIG. 10 is a schematic block diagram of a network device according to an embodiment of this application.

FIG. 10 shows a network device 1000 according to an embodiment of this application. The network device 1000 includes:

a determining unit 1010, configured to determine first indication information, where the first indication information is used to indicate a time domain location occupied in a resource unit by a component pattern of a reference signal; and a sending unit 1020, configured to send the first indication information to a terminal device, so that the terminal device determines the time domain location occupied in the resource unit by the reference signal.

In this embodiment of this application, the network device sends, to the terminal device, the indication information used to indicate the time domain location occupied in the resource unit by the component pattern of the reference signal, so that the terminal device can determine, based on the indication information, the time domain location occupied in the resource unit by the reference signal, to help implement a plurality of different mapping modes of the reference signal and correct channel estimation, and improve data transmission efficiency.

Optionally, the first indication information includes any one piece of the following information: a start symbol location occupied in the resource unit by the component pattern, an offset of the start symbol location relative to a reference symbol, an index of a symbol occupied in the resource unit by the component pattern, and a first bitmap, where the first bitmap is used to indicate a symbol occupation status of the component pattern in the resource unit.

Optionally, the reference signal includes at least two component patterns, and symbol locations occupied in the resource unit by the at least two component patterns are noncontiguous; and the first indication information is used to indicate a start symbol location occupied in the resource unit by each of the at least two component patterns.

Optionally, the first indication information includes the start symbol location occupied in the resource unit by each component pattern: or the first indication information includes a start symbol location set, and the start symbol location set includes the start symbol location occupied in the resource unit by each component pattern: or the first indication information includes an index of the start symbol location set.

Optionally, the sending unit 1020 is further configured to send, second indication information to the terminal device, where the second indication information is used to indicate at least one piece of the following information used by the network device to send the reference signal: a port quantity, a port density, a frequency domain location occupied in the resource unit by the component pattern, and a code division multiplexing CDM type.

Optionally, the reference signal is a channel state information reference signal CSI-RS.

It should be understood that the network device 1000 herein is indicated in a form of the functional units. The term "unit" herein may refer to an application-specific integrated circuit (Application Specific Integrated Circuit, ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that the network device 1000 may be specifically the network device in the foregoing embodiments, and the network device 1000 may be configured to perform the procedures and/or the steps corresponding to the network device in the foregoing method embodiment 300. To avoid repetition, details are not described again herein.

Figure 11:
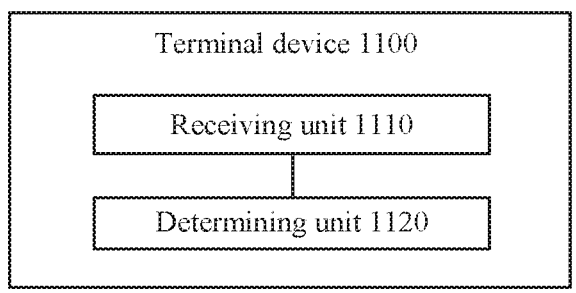
FIG. 11 is a schematic block diagram of another terminal device according to an embodiment of this application.

FIG. 11 shows another terminal device 1100 according to an embodiment of this application. The terminal device 1100 includes:

a receiving unit 1110, configured to receive a second bitmap sent by a network device, where the second bitmap is used to indicate a frequency domain occupation status of a component pattern of a reference signal in a resource unit, where the receiving unit 1110 is further configured to: receive third indication information sent by the network device, where the third indication information is used to indicate at least one piece of the following information used by the network device to send the reference signal: a port quantity, a port density, and a code division multiplexing CDM type: and a determining unit 1120, configured to determine a type and a quantity of component patterns based on the third indication information and a length and content of the second bitmap.

In this embodiment of this application, the terminal device determines the type and the quantity of component patterns with reference to bitmap content used to indicate the frequency domain occupation status of the component pattern, and therefore can determine the time domain location and a frequency domain location occupied in the resource unit by the reference signal, to help implement correct channel estimation and improve data transmission efficiency.

It should be understood that the terminal device 1100 herein is indicated in a form of the functional units. The term "unit" herein may refer to an application-specific integrated circuit (Application Specific Integrated Circuit, ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that the terminal device 1100 may be specifically the terminal device in the foregoing embodiments, the terminal device 1100 may be configured to perform the procedures and/or the steps corresponding to the terminal device in the foregoing method embodiment 400. To avoid repetition, details are not described again herein.

Figure 12:
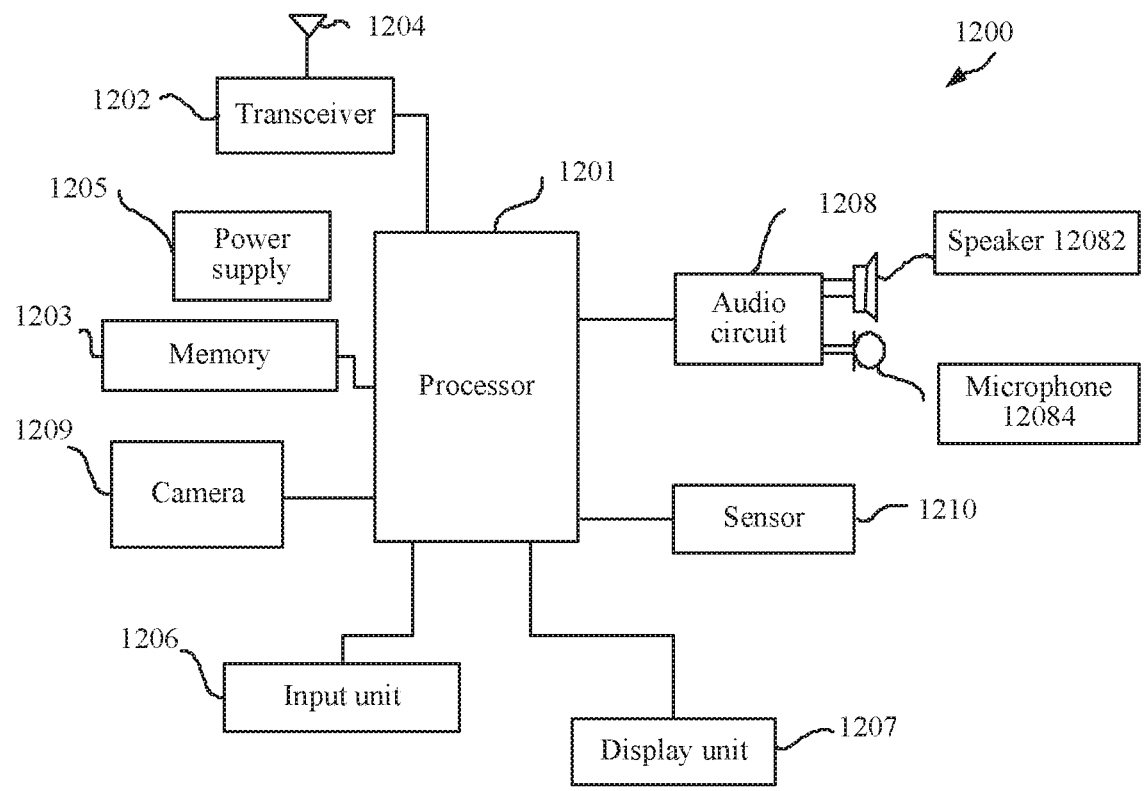
FIG. 12 is a schematic block diagram of another terminal device according to an embodiment of this application.

FIG. 12 shows another terminal device 1200 according to an embodiment of this application. The apparatus 1200 includes a processor 1201, a transceiver 1202, and a memory 1203. The processor 1210, the transceiver 1220, and the memory 1230 communicate with each other through an internal connection path. The memory 1230 is configured to store an instruction, and the processor 1210 is configured to execute the instruction stored by the memory 1230, to control the transceiver 1220 to send a signal and/or receive a signal.

When a program instruction stored by the memory 1203 is executed by the processor 1201, the processor 1201 is configured to: receive, by using the transceiver 1220, first indication information sent by a network device, where the first indication information is used to indicate a time domain location occupied in a resource unit by a component pattern of a reference signal; and determine, based on the first indication information, the time domain location occupied in the resource unit by the reference signal.

The processor 1201 and the memory 1203 may be integrated into a processing apparatus, and the processor 1201 is configured to execute program code stored by the memory 1203, to perform the foregoing functions. During specific implementation, the memory 1203 may be alternatively integrated in the processor 1201, or independent from the processor 1201. The terminal device 1200 may further include an antenna 1204, configured to send, by using a radio signal, uplink data or uplink control signaling outputted by the transceiver 1202.

It should be understood that the terminal device 1200 may be specifically the terminal device in Embodiment 300, and may be configured to perform the steps and/or the procedures corresponding to the terminal device in the method embodiment 300. Optionally, the memory 1203 may include a read-only memory and a random access memory, and provide an instruction and data to the processor. A part of the memory may further include a non-volatile random access memory. For example, the memory may further store information of a device type. The processor 1201 may be configured to execute the instruction stored by the memory. When the processor 1201 executes the instruction stored by the memory, the processor 1201 is configured to perform the steps and/or the procedures in the method embodiment corresponding to the terminal device.

The processor 1201 may be configured to perform actions performed in the terminal in the foregoing method embodiment, but the transceiver 1202 may be configured to perform actions of transmission or sending from the terminal to the terminal device in the foregoing method embodiment. For specifics, refer to descriptions in the foregoing method embodiments, and details are not described herein again.

The terminal device 1200 may further include a power supply 1206, configured to supply power to various components or circuits of the terminal device 1200.

In addition, to further improve the functions of the terminal device, the terminal device 1200 may further include one or more of an input unit 1206, a display unit 1207, an audio circuit 1208, a camera 1209, a sensor 1210, and the like, and the audio circuit may further include a speaker 12082, a microphone 12084, and the like.

Figure 13:
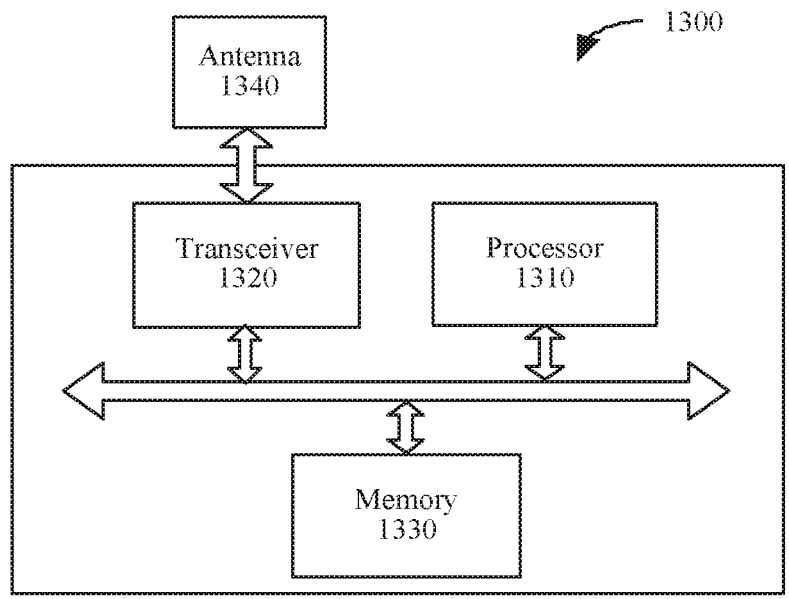
FIG. 13 is a schematic block diagram of another network device according to an embodiment of this application.

FIG. 13 shows another network device 1300 according to an embodiment of this application. The apparatus 1300 includes a processor 1310, a transceiver 1320, and a memory 1330. The processor 1310, the transceiver 1320, and the memory 1330 communicate with each other through an internal connection path. The memory 1330 is configured to store an instruction, and the processor 1310 is configured to execute the instruction stored by the memory 1330, to control the transceiver 1320 to send a signal and/or receive a signal.

When a program instruction stored by the memory 1330 is executed by the processor 1310, the processor 1310 is configured to: determine first indication information, where the first indication information is used to indicate a time domain location occupied in a resource unit by a component pattern of a reference signal: and send the first indication information to a terminal device by using the transceiver 1320, so that the terminal device determines the time domain location occupied in the resource unit by the reference signal.

The processor 1310 and the memory 1330 may be integrated into a processing apparatus, and the processor 1310 is configured to execute program code stored by the memory 1330, to perform the foregoing functions. During specific implementation, the memory 1330 may be alternatively integrated in the processor 1310, or independent from the processor 1310.

The network device 1300 may further include an antenna 1340, configured to send, by using a radio signal, downlink data or downlink control signaling outputted by the transceiver 1320. It should be understood that the network device 1300 may be specifically the network device in Embodiment 200, and may be configured to perform the steps and/or the procedures corresponding to the network device in the method embodiment 300. Optionally, the memory 1330 may include a read-only memory and a random access memory, and provide an instruction and data to the processor. A part of the memory may further include a non-volatile random access memory. For example, the memory may further store information of a device type. The processor 1310 may be configured to execute the instruction stored in the memory, and when the processor 1310 executes the instruction stored in the memory, the processor 1310 is configured to perform steps and/or procedures in the foregoing method embodiments corresponding to the network device.

Figure 14:
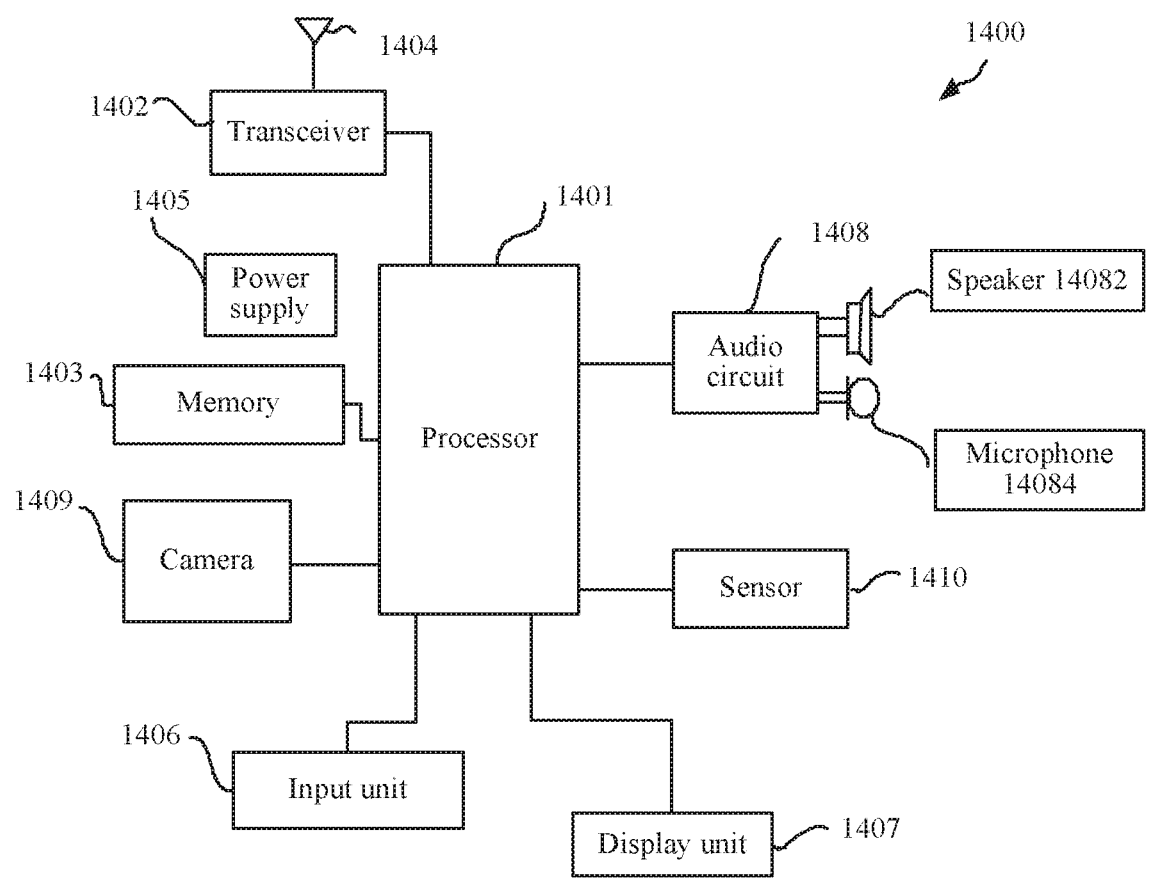
FIG. 14 is a schematic block diagram of another terminal device according to an embodiment of this application.

FIG. 14 shows another terminal device 1400 according to an embodiment of this application. The apparatus 1400 includes a processor 1410, a transceiver 1420, and a memory 1430. The processor 1410, the transceiver 1420, and the memory 1430 communicate with each other through an internal connection path. The memory 1430 is configured to store an instruction, and the processor 1410 is configured to execute the instruction stored by the memory 1430, to control the transceiver 1420 to send a signal and/or receive a signal.

When a program instruction stored by the memory 1403 is executed by the processor 1401, the processor 1401 is configured to: receive, by using the transceiver 1420, a second bitmap sent by a network device, where the second bitmap is used to indicate a frequency domain occupation status of a component pattern of a reference signal in a resource unit; receive third indication information sent by the network device, where the third indication information is used to indicate at least one piece of the following information used by the network device to send the reference signal: a port quantity, a port density, and a code division multiplexing CDM type: and determine a type and a quantity of component patterns based on the third indication information and a length and content of the second bitmap.

The processor 1401 and the memory 1403 may be integrated into a processing apparatus, and the processor 1401 is configured to execute program code stored by the memory 1403, to perform the foregoing functions. During specific implementations, the memory 1403 may be alternatively integrated in the processor 1401, or independent from the processor 1401. The terminal device 1400 may further include an antenna 1404, configured to send, by using a radio signal, uplink data or uplink control signaling outputted by the transceiver 1402.

It should be understood that the terminal device 1400 may be specifically the terminal device in Embodiment 300, and may be configured to perform the steps and/or the procedures corresponding to the terminal device in the method embodiment 300. Optionally, the memory 1403 may include a read-only memory and a random access memory, and provide an instruction and data to the processor. A part of the memory may further include a non-volatile random access memory. For example, the memory may further store information of a device type. The processor 1401 may be configured to execute the instruction stored by the memory. When the processor 1401 executes the instruction stored by the memory, the processor 1401 is configured to perform the steps and/or the procedures in the foregoing method embodiment corresponding to the terminal device.

The processor 1401 may be configured to perform actions performed in the terminal in the foregoing method embodiment, but the transceiver 1402 may be configured to perform actions of transmission or sending from the terminal to the terminal device in the foregoing method embodiment. For specifics, refer to descriptions in the foregoing method embodiments, and details are not described herein again.

The terminal device 1400 may further include a power supply 1406, configured to supply power to various components or circuits of the terminal device 1400.

In addition, to further improve the functions of the terminal device, the terminal device 1400 may further include one or more of an input unit 1406, a display unit 1407, an audio circuit 1408, a camera 14014, a sensor 1410, and the like, and the audio circuit may further include a speaker 14082, a microphone 14084, and the like.

It should be understood that in the embodiment of this application, the processor in the foregoing network device and terminal device may be a central processing unit (central processing unit, CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A resource indication method, comprising:
receiving, by a terminal device, indication information sent from a network device, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
determining, by the terminal device based on the time domain location of the first symbol of each of the at least one first component pattern and the time domain location of the first symbol of each of the at least one second component pattern, a time domain location occupied by the CSI-RS in the resource unit.

2. The method according to claim 1, wherein the indication information is first indication information, the method further comprises:
before the determining the time domain location, receiving, by the terminal device, second indication information sent from the network device, wherein the second indication information includes an indication indicating at least one of a port quantity, a port density, a frequency domain location occupied in the resource unit by a component pattern, or a code division multiplexing (CDM) type; and
determining, by the terminal device, a type and a quantity of component patterns based on the second indication information and a first mapping relationship, wherein the first mapping relationship indicates a correspondence between the second indication information and the type and the quantity of the component patterns; and wherein
the determining the time domain location is further based on the type and the quantity of the component patterns.

3. A resource indication method, comprising:
determining, by a network device, indication information, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
sending, by the network device, the indication information to a terminal device.

4. The method according to claim 3, wherein the indication information is first indication information, the method further comprises:
sending, by the network device, second indication information to the terminal device, wherein the second indication information includes an indication indicating at least one of a port quantity, a port density, a frequency domain location occupied in the resource unit by a component pattern, or a code division multiplexing (CDM) type.

5. A terminal device, comprising:
a transceiver;
at least one processor;
a memory coupled to the at least one processor and storing programming instructions for execution by the at least one processor, the programming instructions instruct the at least one processor to:
receive, through the transceiver, indication information sent from a network device, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
one processor to determine, based on the time domain location of the first symbol of each of the at least one first component pattern and the time domain location of the first symbol of each of the at least one second component pattern, a time domain location occupied by the CSI-RS in the resource unit.

6. The terminal device according to claim 5, wherein the indication information is first indication information, the programming instructions further instruct the transceiver to:
Before the time domain location is determined, receive second indication information sent from the network device, wherein the second indication information includes an indication indicating at least one of a port quantity, a port density, a frequency domain location occupied in the resource unit by a component pattern, or a code division multiplexing (CDM) type; and
the programming instructions further instruct the at least one processor to:
determine a type and a quantity of component patterns based on the second indication information and a first mapping relationship, wherein the first mapping relationship indicates a correspondence between the second indication information and the type and the quantity of the component patterns; and wherein the determine the time domain location is further based on the type and the quantity of the component patterns.

7. A network device, comprising:
a transceiver;
at least one processor;

a memory coupled to the at least one processor and storing programming instructions for execution by the at least one processor, the programming instructions instruct the at least one processor to:
- determine indication information, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
- send, through the transceiver, the indication information to a terminal device.

8. The network device according to claim 7, wherein the indication information is first indication information, the programming instructions further instruct the transceiver to:
send second indication information to the terminal device, wherein the second indication information includes an indication indicating at least one of a port quantity, a port density, a frequency domain location occupied in the resource unit by a component pattern, or a code division multiplexing (CDM) type.

9. A non-transitory computer-readable medium, storing one or more instructions executable by at least one processor to perform operations comprising:
receiving, indication information sent from a network device, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
determining based on the time domain location of the first symbol of each of the at least one first component pattern and the time domain location of the first symbol of each of the at least one second component pattern, a time domain location occupied by the CSI-RS in the resource unit.

10. The non-transitory computer-readable medium according to claim 9, wherein the indication information is first indication information, the operations further comprises:
before the determining the time domain location, receiving second indication information sent from the network device, wherein the second indication information includes an indication indicating at least one of a port quantity, a port density, a frequency domain location occupied in the resource unit by a component pattern, or a code division multiplexing (CDM) type; and
determining a type and a quantity of component patterns based on the second indication information and a first mapping relationship, wherein the first mapping relationship indicates a correspondence between the second indication information and the type and the quantity of the component patterns; and wherein the determining the time domain location is further based on the type and the quantity of the component patterns.

11. A chip, comprising: at least one processor, configured to execute one or more instructions stored in a memory, to enable the chip to execute the one or more instructions to perform operations comprising:
receiving, indication information sent from a network device, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and
determining based on the time domain location of the first symbol of each of the at least one first component pattern and the time domain location of the first symbol of each of the at least one second component pattern, a time domain location occupied by the CSI-RS in the resource unit.

12. The chip according to claim 11, wherein the indication information is first indication information, the operations further comprises:
before the determining the time domain location, receiving second indication information sent from the network device, wherein the second indication information includes an indication indicating at least one of a port quantity, a port density, a frequency domain location occupied in the resource unit by a component pattern, or a code division multiplexing (CDM) type; and
determining a type and a quantity of component patterns based on the second indication information and a first mapping relationship, wherein the first mapping relationship indicates a correspondence between the second indication information and the type and the quantity of the component patterns; and wherein
the determining the time domain location is further based on the type and the quantity of the component patterns.

13. A non-transitory computer-readable medium, storing one or more instructions executable by at least one processor to perform operations comprising:
determining indication information, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and sending the indication information to a terminal device.

14. The non-transitory computer-readable medium according to claim 13, wherein the indication information is first indication information, the operations further comprises:

sending second indication information to the terminal device, wherein the second indication information includes an indication indicating at least one of a port quantity, a port density, a frequency domain location occupied in the resource unit by a component pattern, or a code division multiplexing (CDM) type.

15. A chip, comprising: at least one processor, configured to execute one or more instructions stored in a memory, to enable the chip to execute the one or more instructions to perform operations comprising:

determining indication information, wherein the indication information comprises a first orthogonal frequency division multiplexing (OFDM) symbol index and a second OFDM symbol index, wherein the first OFDM symbol index indicates a time domain location of a first symbol of each of at least one first component pattern of a channel state information reference signal (CSI-RS), wherein the second OFDM symbol index indicates a time domain location of a first symbol of each of at least one second component pattern of the CSI-RS, and wherein the at least one first component pattern and the at least one second component pattern occupy symbol locations in a resource unit that are non-contiguous in time domain; and sending the indication information to a terminal device.

16. The chip according to claim 15, wherein the indication information is first indication information, the operations further comprises:

sending second indication information to the terminal device, wherein the second indication information includes an indication indicating at least one of a port quantity, a port density, a frequency domain location occupied in the resource unit by a component pattern, or a code division multiplexing (CDM) type.

* * * * *